United States Patent
Kostov et al.

(10) Patent No.: US 9,213,120 B2
(45) Date of Patent: Dec. 15, 2015

(54) SEISMIC DATA PROCESSING METHOD FOR SURFACE RELATED MULTIPLE ATTENUATION

(75) Inventors: Clement Kostov, Trumpington (GB); Martin Musil, Brno (CZ); Henrik Bernth, London (GB)

(73) Assignee: WESTERNGECO LLC, Houston, TX (US)

( * ) Notice: Subject to any disclaimer, the term of this patent is extended or adjusted under 35 U.S.C. 154(b) by 817 days.

(21) Appl. No.: 12/740,484

(22) PCT Filed: Nov. 18, 2008

(86) PCT No.: PCT/GB2008/003863
§ 371 (c)(1),
(2), (4) Date: Oct. 7, 2010

(87) PCT Pub. No.: WO2009/066057
PCT Pub. Date: May 28, 2009

(65) Prior Publication Data
US 2011/0038227 A1   Feb. 17, 2011

Related U.S. Application Data

(60) Provisional application No. 60/988,972, filed on Nov. 19, 2007.

(51) Int. Cl.
*G01V 1/48* (2006.01)
*G01V 1/38* (2006.01)
*G01V 1/36* (2006.01)

(52) U.S. Cl.
CPC .............. *G01V 1/3808* (2013.01); *G01V 1/364* (2013.01); *G01V 2210/56* (2013.01)

(58) Field of Classification Search
CPC .. G01V 1/3808; G01V 1/364; G01V 2210/56
USPC ........... 367/20, 21, 24, 36, 54, 73, 91, 43, 38; 702/14, 17
See application file for complete search history.

(56) References Cited

U.S. PATENT DOCUMENTS 5,050,133 A * 9/1991 Buddery ..................... 367/91
5,073,876 A * 12/1991 Propes ........................ 367/54
(Continued)

FOREIGN PATENT DOCUMENTS

WO          0067045 A1    11/2000
WO    WO 2004099819 A2 * 11/2004 ............... G01V 1/36

OTHER PUBLICATIONS

Amundsen et al: "Multidimensional signature deconvolution and free-surface multiple elimination of marine multicomponent ocean-bottom seismic data", Geophysics, vol. 66, No. 5, 2001, pp. 1594-1604.

(Continued)

*Primary Examiner* — Daniel L Murphy (57) ABSTRACT

An embodiment of the invention relates to a method of processing seismic data comprising a plurality of traces, each trace having a source position, a receiver position and a midpoint position, each having coordinates in an inline direction and a crossline direction. The invention uses a data set comprising traces having one of the source position, the receiver position or the midpoint position having coordinates which are invariant in one of the inline or the crossline directions. A non-iterative surface related multiple attenuation algorithm is applied to the data set which assumes substantial non-variation of depth of reflectors in the same one of the inline or the crossline directions.

30 Claims, 4 Drawing Sheets

(56) References Cited

U.S. PATENT DOCUMENTS

| | | | |
|---|---|---|---|
| 5,587,965 | A | 12/1996 | Dragoset, Jr. et al. |
| 6,292,755 | B2 * | 9/2001 | Chambers et al. ............... 702/17 |
| 6,493,636 | B1 * | 12/2002 | DeKok ............................ 702/17 |
| 7,672,192 | B2 | 3/2010 | Moore et al. |
| 2005/0265122 | A1 * | 12/2005 | Grion ............................. 367/21 |
| 2006/0098529 | A1 | 5/2006 | Anderson et al. |
| 2006/0155477 | A1 * | 7/2006 | Matson et al. .................. 702/14 |
| 2006/0256658 | A1 * | 11/2006 | Christie et al. .................. 367/43 |
| 2011/0044127 | A1 | 2/2011 | Kostov et al. |

OTHER PUBLICATIONS

Bereux: "Fast direct solvers for some complex symmetric block Toeplitz linear systems", Linear Algebra and its Applications, vol. 404, 2005, pp. 193-222.

Hadidi et al: "Surface-related multiple elimination on wide-tow marine data", The Leading Edge, vol. 21, Aug. 2002, pp. 787-790.

Kelamis et al: "Surface-related multiple elimination on land seismic data—Strategies via case studies", Geophysics, vol. 65, No. 3, 2000, pp. 719-734.

Matson et al: "2.50 method for attenuating free-surface multiples based on inverse scattering series", 2000 Offshore Technology Conference, Houston, Texas, May 1-4, 2000, OTC 12050.

Musil et al: "A 2.5D method for removal of free-surface-related seismic events", 70th EAGE Conference and Exhibition, Rome, Italy, Jun. 9-12, 2008, G046.

Wapenaar et al: "Amplitude preprocessing of single and multicomponent seismic data", Geophysics, vol. 57, No. 9, 1992, pp. 1178-1188.

International Search Report of PCT Application No. PCT/GB2008/003863 dated Jun. 16, 2010.

* cited by examiner

SEISMIC DATA PROCESSING METHOD FOR SURFACE RELATED MULTIPLE ATTENUATION

FIELD OF THE INVENTION

The present invention relates to a method of processing seismic data, and in particular but not by way of limitation to a method of processing seismic data for the attenuation of surface related multiple events.

BACKGROUND

Seismic data are typically gathered using an array of detectors. In the case of marine data, hydrophones measure pressure fluctuations in the water caused by incoming seismic waves. Geophones measure vector quantities such as displacement, velocity or acceleration. In the case of marine data, a plurality of cables or streamers, which are spaced apart typically by about 100 meters, are towed behind a boat. Each cable has detectors spaced along the cable at intervals. In the case of land data, a geophone array is laid out on the ground with the geophones in an approximate grid formation. The detector array detects seismic signals from reverberations of a signal from a seismic source, such as an airgun for marine data. In Ocean Bottom (OBC or OBS) acquisition, a detector array is fixed on the sea bed. The source may be an airgun mounted on a boat.

Figure 1:
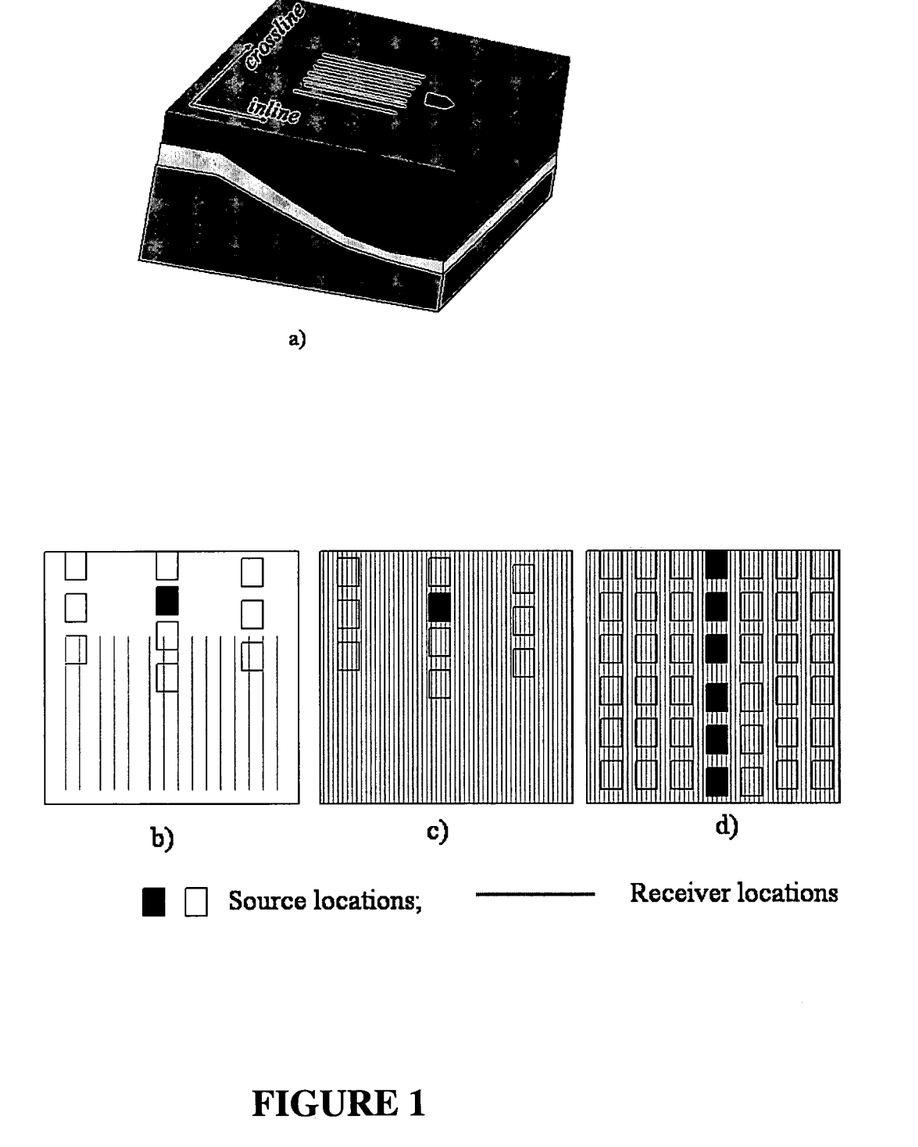
FIG. 1a illustrates the assumption of a 2.5D earth wherein the geology is substantially invariant in one direction.
FIG. 1b illustrates conventional 3D streamer acquisition having coarse sampling of source and receiver locations.
FIG. 1c illustrates the sampling of source and receiver locations in wide-azimuth and rich azimuth surveys.
FIG. 1d illustrates the preferred sampling of source and receiver locations for 3D methods for removal of free surface effects.

As illustrated in FIG. 1a, the direction in which the source moves, which in a marine environment is the direction in which the boat sails, is referred to as the inline direction. The perpendicular direction is the crossline direction. Lines of receivers, which are streamers in a towed streamer marine acquisition, are spaced apart in the crossline direction.

In a towed streamer system, ideally the streamers would be parallel, but in reality due to currents etc. there will be drift of the streamers, particularly towards the free ends. Some acquisition systems include streamer steering to maintain the streamers as close to being parallel as possible. Each streamer includes a plurality of receivers which are typically spaced equally along the length of the streamer. A source is positioned behind the boat, typically between the boat and the fixed end of the streamers. The source, typically an air gun, fires a seismic signal at intervals as the boat sails in the inline direction. Shots may be fired, for instance, every 25 meters. The streamer spacing in the crossline direction is typically of the order of 100 meters. The receiver spacing along the streamers may also be the order of approximately 25 meters and the streamers may be several kilometers long, with 6-10 km being a typical range. The receivers record seismic energy which is reflected from the ocean bottom and various reflectors or boundaries between geological layers in the earth.

It is well known that an interface will reflect sound waves at a magnitude that is dependent on the relative velocities of the sound waves in the medium on either side of the interface. Therefore, because water and air have a large difference in seismic velocity, the air/water interface at the water surface has a very high reflection coefficient. Therefore, one problem in processing marine seismic data (both with towed streamer acquisition and OBC acquisition) is free surface multiples which result from seismic energy which is reflected from the free surface, possibly having already been reflected from the earth. Because of the high reflection coefficient, these free surface multiples appear as high magnitude events on a seismic profile thus obscuring data from real sub-surface events.

A number of data processing algorithms exist for the attenuation of surface related multiples. Algorithms can operate on 3D data, i.e. data having source and receiver positions covering a surface grid, or on 2D data where the source and receiver positions are located on a single line. Methods applied to 3-D data generally have the disadvantage of being computationally intensive whereas methods applied to 2D data may be less accurate.

Surface related multiple elimination (SRME) algorithms can be divided into iterative and non-iterative SRME methods.

In iterative SRME algorithms, approximations in the modeling are handled approximately by processing a model of free-surface multiples, computed at each iteration of SRME, by applications of matching filters. In addition, the amplitude correction that should be applied before processing 3D with a 2D algorithm is in general applied in a form valid for constant velocity media only.

Matson and Corrigan ("2.5D Method for Attenuating Free-Surface Multiples Based on Inverse Scattering Series", Proceedings of the Annual Off-Shore Technology conference 1, pages 309 to 318, 2000) discloses 2D, 3D and 2.5D iterative multiple attenuation methods for towed streamer data. In the 2.5D approach, a 3D algorithm is specialised to the case where the earth can be assumed invariant (or slowly variant) in one direction, on a scale relevant for a seismic survey.

Examples of non-iterative algorithms are disclosed in Dragoset and Jericevic (U.S. Pat. No. 5,587,965) and Amundsen et al., ("Multidimensional Signature Deconvolution and Free-Surface Multiple Elimination of Marine Multicomponent Ocean-Bottom Seismic Data", Geophysics Vol. 66, No. 5, pages 1594 to 1604, 2001). Amundsen et al. disclose a method using ocean-bottom cable data wherein the input data are separated into up-going and down-going wave fields and a multiple dimensional deconvolution operator is derived from the down-going wave field. This is referred to as the MAUDD (Multiple Attenuation by Up/Down Deconvolution) algorithm. In the MAUDD approach, the input data is separated into upgoing and downgoing wavefields, and a multi-dimensional deconvolution operator is derived from the downgoing wavefield. The Amundsen method is often applied to wide-azimuth sea-bed data assuming a 1D earth (with properties varying with depth only); applications of the 2D algorithm to sea-bed data have also been reported.

Although iterative SRME methods are currently the most popular ones, other approaches have been suggested that try to improve on some aspects of SRME. For instance, the model produced by iterative SRME doesn't correctly predict the amplitudes of all orders of multiples (especially at initial iterations, when the modeling operator(s) is built from data rather than from primaries). Non-iterative SRME methods, such as the method published by Dragoset and Jericevic offer an alternative approach, which has been restricted to applying a 2D algorithm to 3D data.

SUMMARY

The present invention provides a method of processing seismic data comprising a plurality of traces, each trace having a source position, a receiver position and a midpoint position, each having coordinates in an inline direction and a crossline direction comprising:
  using a data set comprising traces having one of the source position, the receiver position or the midpoint position having coordinates which are invariant in one of the inline or the crossline directions; and
  applying to the data set a non-iterative surface related multiple attenuation algorithm which assumes substantial non-variation of depth of reflectors in the same one of the inline or the crossline directions.

In one embodiment, the surface related multiple attenuation algorithm comprises separating the data into an upgoing and a downgoing wavefield and deriving a multi-dimensional deconvolution operator from the downgoing wavefield.

In one embodiment, the surface related multiple attenuation algorithm comprises separating the data into an upgoing and a downgoing wavefield and deriving a multi-dimensional deconvolution operator from the upgoing wavefield and an estimate of the source signature.

In one embodiment, the data is marine data and the lines of receivers are towed streamers and the data includes depth data relating to the depth of the receivers below the water surface, and said depth data is used to derive the upgoing and downgoing wavefields.

Alternatively, the upgoing and downgoing wavefields may be derived from data acquired using streamers having over/under configuration. In this embodiment, a plurality of pairs of streamers are spaced apart in the crossline direction, wherein each pair consists of a first streamer located at a first depth and a second streamer located at a second depth below the first depth.

Alternatively, the upgoing and downgoing wavefields may be derived from pressure data and particle velocity or acceleration data. This can be acquired in acquisition systems using geophones in addition to hydrophones, to measure particle velocity or acceleration.

In one embodiment the data set comprises traces having source positions invariant in the crossline direction, which are located on a single source line and the receiver positions are located along parallel lines having offsets in a crossline direction from the source line.

Preferably, the crossline spacing of the receiver positions in the data set is smaller than the crossline spacing of the lines of receivers in the acquired data.

This may be achieved by obtaining the data set by combining more than one data set from more than one line of source points having the same source positions, wherein the streamer positions in each sail line have different crossline offsets.

Alternatively, this can be achieved by obtaining the data set by interpolating data in the crossline direction to obtain data at interpolated receiver positions having crossline offsets between the crossline offsets of the line of receivers in the acquired data.

Preferably, for each source position, receiver positions have both negative and positive offsets in the inline direction.

The present invention also provides a method of processing seismic data comprising:

using a data set comprising seismic data in which a plurality of source positions are located on a single source line and a plurality of receiver positions are located along parallel lines having offsets in a crossline direction from the source line; and applying to the data set a non iterative surface related multiple attenuation algorithm which assumes substantial non-variation of depth of reflectors in the crossline direction.

Preferably the crossline spacing of the receiver positions in the data set is smaller than the crossline spacing of the lines of receivers in the acquired data. This may be achieved by the methods set out above, such as combining data sets acquired by a boat repeating a line of source positions wherein the streamer positions in each sail line have different crossline offsets, or by interpolating data in the crossline direction.

The present invention also provides a computer readable medium having a computer program stored thereon, the computer program comprising computer readable instructions for carrying out any of the methods as set out above.

BRIEF DESCRIPTION OF THE DRAWINGS

Embodiments of the present invention will now be described with reference to the accompanying drawings, in which.

DESCRIPTION

Embodiments of the present invention relate to methods for removal of free-surface effects from seismic data.

As shown in FIG. 1b, conventional 3D towed streamer surveys are undersampled in sources and receivers in the crossline direction (i.e. the direction orthogonal to the sail direction of the acquisition vessel) with respect to requirements for 3D algorithms for removal of free-surface multiples (SRME methods).

FIG. 1d illustrates the preferred sampling of source and receiver locations for 3D algorithms. In the recent wide-azimuth and rich azimuth surveys, the sampling in receiver positions is improved, as shown in FIG. 1c, but source locations are still undersampled in one direction. As a consequence of the sampling of towed streamer data, processing algorithms for surface-related multiple elimination are applied either in a 2D mode on surface lines, or, in 3D mode after substantial interpolation.

The present inventors start from the assumption of a 2.5D earth as illustrated in FIG. 1a, i.e. earth properties that are slowly varying in the crossline direction (perpendicular to the inline direction) and derive specialized expressions of the 3D algorithms under the 2.5D assumption.

The present invention can be illustrated with respect to two non-iterative algorithms, the MAUDD algorithm disclosed for the 3D case by Amundsen et al., ("Multidimensional Signature Deconvolution and Free-Surface Multiple Elimination of Marine Multicomponent Ocean-Bottom Seismic Data", Geophysics Vol. 66, No. 5, pages 1594 to 1604, 2001), and the non-iterative algorithm disclosed by Dragoset and Jericevic (U.S. Pat. No. 5,587,965).

2.5D MAUDD

The equations for 3D MAUDD are given in Amundsen (2001). These equations are applicable to any 3D subsurface volumes and involve integration of data over a 2D surface parameterized by coordinates $\chi=(x,y)$.

The equations for 3D MAUDD can be simplified for the case of a 2D subsurface section and data acquired over a line by assuming that all data have a common coordinate, for instance $\chi=(x,0)$. The integral over a 2D surface mentioned above reduces in the 2D case to integration along a line (1D).

We now derive equations for a 2.5D version of the MAUDD method, by making the following assumptions:
- the survey is acquired in the inline (x) direction;
- the subsurface geology is invariant in the crossline (y) direction;
- the source array radiates symmetrically with respect to the inline (x) direction
- the streamers are positioned symmetrically with respect to the inline (x) direction.

In practice, these conditions may be relaxed to some extent by assuming only slow variation of the subsurface geology in the crossline direction, interpolating (rather than acquiring) symmetrical receiver positions.

We denote u an upgoing pressure wavefield, d the downgoing pressure, p the primary pressure wavefields, and $\tilde{a}$ a user-defined source wavelet. It may be assumed that the equations are solved for each temporal frequency component of the data. The 3D equations for the unknown primary pressure p (without direct arrival), $$\tilde{a}u(x_r,y_r|x_s,y_s) = \iint p(x,y|x_r,y_r)d(x,y|x_s,y_s)dxdy,$$

can be simplified then by a change of variables $$y_h = y_s - y_r \text{ and } v = y - y_r,$$

leading to $$\tilde{a}u(x_r,-y_h|x_s,0) = \iint p(x,v|x_r,0)d(x,v-y_h|x_s,0)dxdv. \qquad (1)$$

In the above equation, the crossline source coordinates have been eliminated, thus reducing both the data requirements and the computational costs. Indeed, the data required are data from one sail line only, and the computations involve convolutions in the crossline direction. As indicated in Amundsen (2001), in the above equations the upgoing wavefield u can be replaced by the total wavefield (u+d), in which case the solution for the primary pressure p will also contain the direct arrival.

The above equations are written for continuous wavefields, i.e. wavefields defined at all space locations. For discretely sampled wavefields, such as field seismic data, it is convenient to introduce so-called data matrices, which contain all data values for a particular temporal frequency. For instance the data matrix for the downgoing wavefield has shot coordinates along rows and receiver coordinates along columns.

In 2.5D the data matrices have a block-Toeplitz structure:

$$D = \begin{bmatrix} D_0 & D_1 & D_2 & \dots & \dots & \dots & D_{2n-1} & D_{2n} \\ D_{-1} & D_0 & D_1 & \dots & \dots & \dots & D_{2n-2} & D_{2n-1} \\ \dots & \dots & \dots & \dots & \dots & \dots & \dots & \dots \\ D_{-n} & \dots & \dots & D_0 & \dots & \dots & \dots & D_n \\ \dots & \dots & \dots & \dots & \dots & \dots & \dots & \dots \\ \dots & \dots & \dots & \dots & \dots & \dots & \dots & \dots \\ D_{-2n} & \dots & \dots & \dots & \dots & \dots & \dots & D_0 \end{bmatrix}$$

where $D_i$ is a matrix built with data from one streamer. The index i corresponds to the (signed) crossline offset between the shot points and the streamer. We introduce n, the number of streamers; where the following apply i>n, $D_i=0$ and by symmetry with respect to the inline direction, $D_i=D_{-i}$. A system of equations for discretely sampled data can be derived from equation (1) above and may be written in terms of matrices as follows:

$$\tilde{a}DP = U, \qquad (2)$$

with the data matrix for the downgoing pressure wavefield D as defined above, and the upgoing (U) and primary (P) pressure wavefields $$U = \begin{bmatrix} U_{-n} \\ U_{-n+1} \\ U_{-n+2} \\ \dots \\ U_0 \\ \dots \\ U_n \end{bmatrix} \text{ and } P = \begin{bmatrix} P_{-n} \\ P_{-n+1} \\ P_{-n+2} \\ \dots \\ P_0 \\ \dots \\ P_n \end{bmatrix}$$

The linear system can be solved by LU decomposition, preferably using specialized solvers that exploit the block-Toeplitz structure mentioned above (Bereux et al., 2005, Fast direct solvers for some complex symmetric block Toeplitz linear systems: Linear Algebra and its Applications, 404, 193-222.). Due to limited aperture and tapering, P may only be useful for a small range of crossline offsets.

We mentioned above that the solution of equations (1) for 2.5D media involves a convolution along the crossline offset coordinate. A general property of linear convolutional systems is that the convolution can be applied in a wavenumber transform domain by simple multiplication of wavenumber components. Applying a Fourier transform in equations (1) to the crossline offset variable and denoting the corresponding wavenumbers by $k_{hy}$, leads to $$\tilde{a}u(x_r,k_{hy}|x_s) = \int P(x,-k_{hy}|x_r,0)D(x,k_{hy}|x_s)dx. \qquad (3)$$

Therefore, the 2.5D problem can be solved as a series of 2D problems after taking a Fourier transform in the crossline direction. The 2.5D problem reduces to a sequence of smaller 2D problems, one for each crossline receiver wavenumber. Solving the sequence of smaller 2D problems in equations (3) would be less computationally intensive than solving the one larger problem (2) with solvers for general linear systems.

Other 2.5D Multiple Attenuation Methods

The 2.5D approximations are of interest for other multiple attenuation methods, especially when these methods involve computationally expensive solutions of linear systems of equations.

Dragoset and Jericevic (1996) have proposed a method for a non-iterative 2D SRME method applicable to subsets of 3D data (surface lines, consisting of all the shot in a sail line for a particular streamer). The relation between wavefields with primaries only (P) and the upgoing component of the data acquired with free-surface multiples (U), is expressed as follows, $$U = \left(I + \frac{1}{a}[2ik_z]U\right)P, \qquad (4)$$

where a is the source signature, I is the identity matrix and $k_z$ is a vertical wavenumber. Equation 4 is closely related to equation (2) via a triangular relation between the downgoing wavefield (D), the direct arrival and the upgoing wavefield (U), and a particular choice of user-defined wavelet $\tilde{a}$ equal to the source signature a.

Equations (4) can be written for the 2.5D case similarly to the previous section. The matrix $$\left(I + \frac{1}{a}[2ik_z]U\right)$$

plays a similar role to matrix D in equation (2), and similarly has a block-Toeplitz structure.

The system of equations for non-iterative 2.5D SRME could then be solved by using the block-Toeplitz structure as in equations (2), or by reducing the equations to a sequence of smaller sets of equations for 2D SRME as in equations (3).

Acquisition

Figure 2:
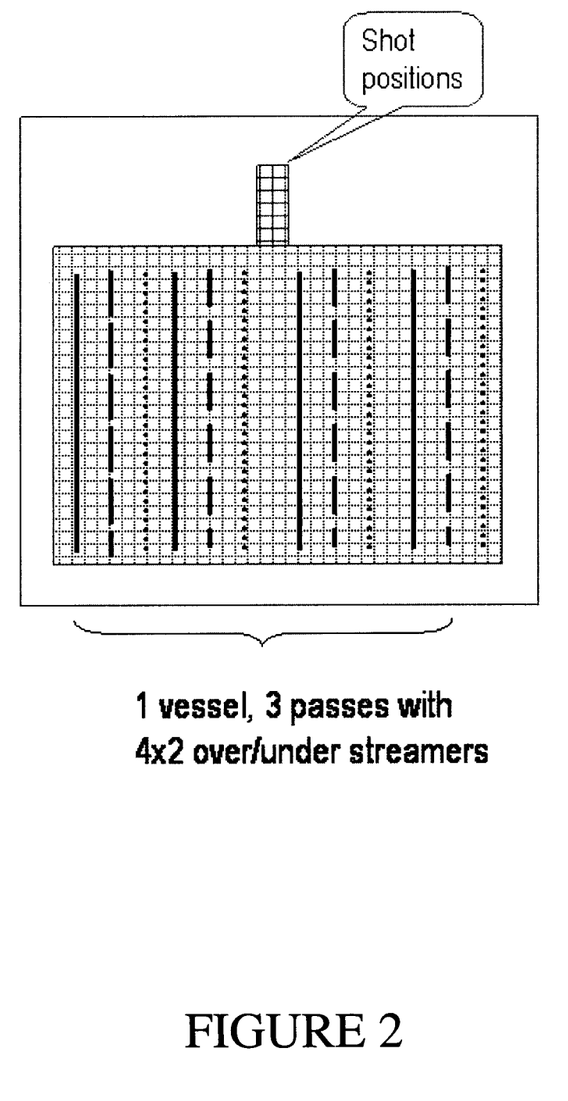
FIG. 2 illustrates acquisition of data having dense inline and crossline sampling through repeating shot locations and steering the streamers.

The present invention preferably uses shot gathers that are well sampled in receiver positions, as shown in FIG. 1c. The crossline sampling should preferably be of the order of 25 m, rather than the conventional 100 m. This could be achieved by repeating sail lines and source positions and interleaving the streamer positions, as shown in FIG. 2. To extend crossline aperture, it is possible to use source vessel that is different from the one towing the streamers.

Figure 3A:
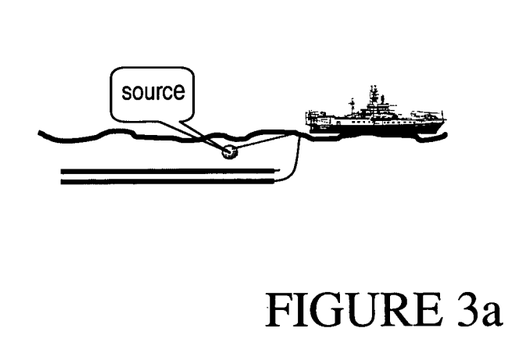
FIG. 3a illustrates a vertical section of an over/under streamer configuration for recording near field data.

Some methods also require separation into upgoing and downgoing waves. In such methods, the data may be acquired using an over/under configuration of streamers and repeated passes, as shown in FIG. 3a. Note, that it may be more economical for up/down separation, but less optimal, to repeat sail lines with so-called two-pass over/under configuration and any acquisition system.

Figure 3B:
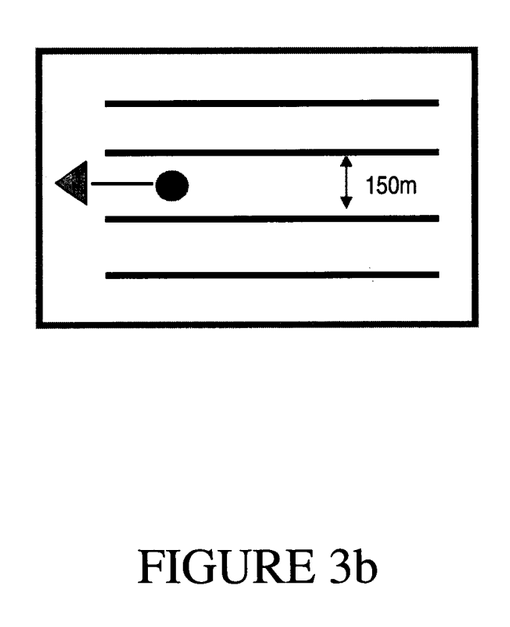
FIG. 3b illustrates a plan view of an over/under streamer configuration.

For some methods, we also require sampling of the near offsets and negative offsets, for example to determine the source signature. Methods for achieving this consist essentially in towing the source array further back than usual, as shown in FIG. 3b.

The direct arrivals and their ghosts are required in some methods for all receiver positions. The direct arrivals may be obtained from a system which uses near-field hydrophones to estimate the direct arrivals and their ghosts.

Results

Figure 4:
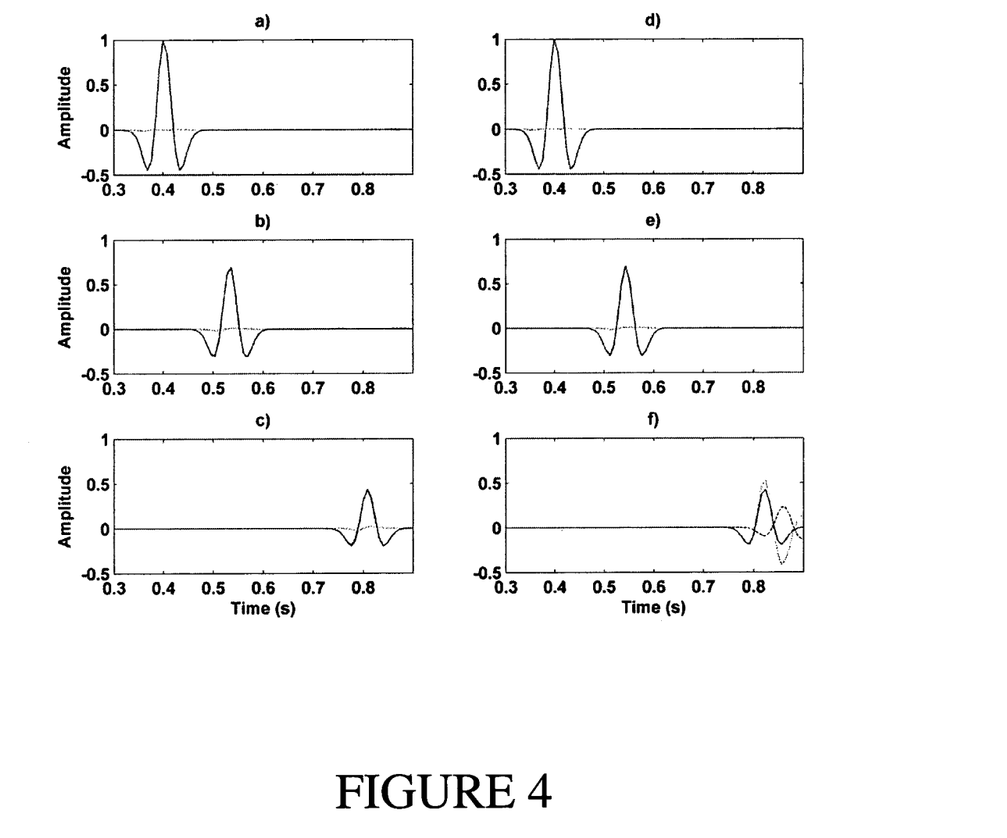
FIG. 4 shows results for the MAUDD 2.5D algorithm using synthetic data.

Example results for the MAUDD 2.5D algorithm using synthetic data are shown in FIG. 4. The synthetic data are computed by ray tracing for an earth model consisting of one reflector (sea bed) with inline dip of 2.5 degrees and sea-bed depth variations from 300 m to 125 m. The source wavelet is a Ricker wavelet with central frequency of 12 Hz. The acquisition geometry is such that shot and receiver group intervals are 25 m, inline offsets vary from −1000 m to 3000 m, and crossline offsets vary from −1000 m to 1000 m. The synthetic dataset consists of a sail line of 161 shot positions.

FIGS. 4a-4f display MAUDD 2.5D results for traces at different locations from the same shot gather at the centre of the sail line. Each figure compares a MAUDD 2.5D result (solid line) to a reference result computed by ray-tracing in a model without free surface (dashed line), and to the difference between the MAUDD 2.5D and the reference results (dotted line).

The locations at which traces are compared are as follows: (a) 0 m inline and crossline offsets; (b) 500 m inline and 0 m crossline; (c) 1000 m inline and 0 m crossline; (d) 0 m inline and crossline offsets; (e) 0 m inline and 500 m crossline; (f) 0 m inline and 1000 m crossline. The comparison between the MAUDD results and the reference traces is excellent in all cases except for the case of the 1000 m crossline offsets (FIG. 4f), which is affected by the taper applied at crossline offsets larger than 650 m.

To contrast the result of MAUDD 2.5D processing with conventional 2D processing applied to 3D data, in the latter the pre-processing sequence would be more complex involving amplitude and differential NMO corrections to simulate 2D data with zero crossline offset from 3D data recorded at finite-offset. The results of this type of processing are not as good as the 2.5D results when 2.5D assumptions are met.

The 2.5D MAUDD method can be used to predict multiples rather than to compute directly a primary response; similar to versions of MAUDD for 1D or 2D.

Merging 2.5D and 3D Solutions

It is possible to merge 2.5D with 3D solutions by computing 3D non-iterative solutions which consist of imposing 2.5D or even 1D earth assumptions for parts of the survey. Such assumptions or constraints will be set according to estimates of the performance of the methods (2.5D or 3D MAUDD and SRME), obtained following a similar approach to that described by Moore et al. (2003). When constructing data matrices using such assumptions, it is expected that structures in parts of the data matrices could be exploited to speed-up the numerical solutions.

Processing Subsets of Data with Common Crossline Midpoint Positions

Algorithms that make the assumption of a 1D background medium are best applied to subsets of data having a common midpoint position rather than a common shot or common receiver position. Examples of removing multiples from land data using a 1D background assumption are discussed for instance in Kelamis and Verschuur (Surface-related multiple elimination on land seismic data—Strategies via case studies: Geophysics, Volume 65, Issue 3, pp. 719-734, 2000). In embodiments of the present invention, the data may be processed in a mixed domain that has inline shot coordinates and crossline midpoint coordinates.

Formally, seismic data is a function of time t and six space coordinates: 3 coordinates for the source position (Xs, Ys, Zs) and 3 coordinates for the receiver position (Xr, Yr, Zr). A common-shot gather is defined as a collection of traces with shot coordinates (Xs, Ys), the shot coordinates being exactly the same, or close to each other within some tolerance (e.g. 5-15 m). The transformation to midpoint-offset is defined as follows for crossline coordinates (Mx, Hx):

$$Mx = (Ys + Yr) * 0.5 \text{ and}$$

$$Hx = (Yr - Ys) * 0.5.$$

Similar definitions apply for inline midpoint and offset. As such, the data becomes a function of the following coordinates (t, Xs, Xr, Mx, Hx, Zs, Zr).

The algorithm is more tolerant to variation from the assumption of crossline invariance of the geology when it is applied to data having common midpoint crossline positions than when applied to data having common shot crossline positions. In embodiments of the present invention, it is suggested then to apply the 2.5D algorithms either to a sail line (Ys constant) when the crossline dip (on the main reflectors generating multiples) is less than 2 degrees, or, to a collection of data such that the crossline midpoint position remains constant (e.g. My constant) when the crossline dip becomes larger. In some embodiments of the present invention, the algorithm may still be effective when applied to data having common crossline midpoint positions if the crossline dip (on the main reflectors generating multiples) is up to 10 degrees.

In summary, in embodiments of the present invention, non-iterative 3D algorithms for multiple attenuation and free-surface removal may be specialised to the case where the earth can be assumed invariant (or slowly variant) in one direction, on a scale relevant for a seismic survey (few kilometers). Additional acquisition features or seismic data processing steps may be used to increase sampling intervals.

The assumption of a 2.5D medium in accordance with an embodiment of the present invention, provides for deriving specialized forms of 3D algorithms that have different cost and accuracy trade-off than the current 2D and 3D methods. In aspects of the present invention, the new 2.5D versions of the algorithms should be useful in a variety of cases:

As an alternative to 2D algorithms, bringing improvements in results and some simplifications to the 2D workflows (no need for approximate amplitude corrections);

As an alternative to 3D algorithms, of interest for its lower cost, and benefits from the non-iterative approach.

The 2.5D algorithms assume well sampled shot gathers, i.e. dense and regular sampling of the wavefield at the receiver array. There are several ways in which acquisition systems can help with meeting these requirements:

A system which uses geophones to measure particle velocity or acceleration in directions parallel to the surface (in addition to hydrophones which measure pressure) allow interpolation of wavefields in the crossline direction;

Repeated boat passes with shooting at the same shot locations could be used to acquire shot gathers with dense crossline spacing and large aperture.

The larger apertures available from wide-azimuth streamer surveys are helpful in this approach.

The MAUDD algorithm requires separation of the upgoing and downgoing wavefields, which can be achieved by features of the acquisition:

An over/under configuration in which pairs of streamers at different depths (FIG. 3a) can be used to allow separation of the total wavefield into upgoing and downgoing components.

The direct wave needed can be estimated using a system in which data from near field hydrophones placed near each gun of the source array are used to detect and characterise the wavefield emitted by the source (FIG. 3b).

Embodiments of the present invention start from the assumption of a 2.5D earth as illustrated in FIG. 1a, i.e. earth properties that are slowly varying in the crossline direction (perpendicular to the inline direction). In embodiments of the present invention, specialized expressions of the 3D algorithms under the 2.5D assumption are derived. These algorithms may be applied sequentially to each sail line, processing all of the streamers in the sail line at once, and provide a more accurate prediction of multiples than 2D methods. The 2.5D assumption allows also, among other things, for efficient numerical solutions, making it computationally feasible to apply the more accurate non-iterative methods.

A use of the new method would be in combination with the 3D method, where the applications of the computation intensive 3D method may be restricted to only specific parts of the survey, the determination being made on the basis of cost and accuracy predictions.

Aspects of the present invention combine requirements on the input data and algorithmic developments. One way for fulfilling requirements on the input data is during acquisition, examples of which are provided herein using towed streamer or seabed acquisition. Another way is to increase crossline sampling by interpolation of data.

While the principles of the disclosure have been described above in connection with specific apparatuses and methods, it is to be clearly understood that this description is made only by way of example and not as limitation on the scope of the invention.

The invention claimed is:

1. A method of processing seismic data comprising a plurality of traces, each trace having at least a source position, a receiver position, each having coordinates in an inline direction and a crossline direction, and a time or a frequency, the method comprising:

receiving the seismic data from a plurality of towed streamers towed through a body of water, wherein the seismic data is generated by a source signal produced by a seismic source array and each of the plurality of streamers comprises a plurality of receivers, wherein the seismic data have at least five dimensions, four of which are source crossline, source inline, receiver crossline, and receiver inline, and the fifth of which is time or frequency; and using a computer to read a computer readable non-transitory medium having a computer program stored thereon, wherein the computer program comprises computer readable instructions for:

determining direct arrivals and ghosts of the direct arrivals in the seismic data, wherein the direct arrivals comprise signals traveling directly from the seismic source array through the body of water to the plurality of receivers;

correcting the seismic data by removing the direct arrivals and the ghosts of the direct arrivals;

generating a data set from the corrected seismic data comprising eliminating crossline source coordinate to derive four-dimensional seismic data, three dimensions of which are source inline, receiver crossline offset, receiver inline and the fourth of which is time or frequency;

applying to the data set a non-iterative surface related multiple attenuation algorithm to predict multiples; and eliminating multiples to derive multiple-free seismic data.

2. The method according to claim 1, wherein the surface related multiple attenuation algorithm is determined by separating the corrected seismic data into an upgoing and a downgoing wavefield and deriving a multi-dimensional deconvolution operator from the downgoing wavefield.

3. The method according to claim 1, wherein the surface related multiple attenuation algorithm is determined by separating the corrected seismic data into an upgoing and a downgoing wavefield, and a multi-dimensional deconvolution operator is derived from the upgoing wavefield and an estimate of a source signature.

4. The method according to claim 2, wherein the seismic data includes depth data relating to the depth of the receivers below the water surface, and said depth data is used to derive the upgoing and downgoing wavefields.

5. The method according to claim 1, wherein the seismic data includes data from a plurality of pairs of the streamers spaced apart in the crossline direction, wherein each pair consists of a first streamer located at a first depth and a second streamer located at a second depth below the first depth.

6. The method according to claim 2, wherein the seismic data includes pressure data and particle velocity or acceleration data.

7. The method according to claim 1, wherein the receiver positions are located along parallel lines having offsets in a crossline direction from the source line.

8. The method according to claim 7, wherein crossline spacing of the receiver positions in the data set is smaller than crossline spacing of the lines of receivers in the received seismic data.

9. The method according to claim 8, the method further comprising obtaining the data set by combining more than one data set from more than one line of source points and receiver points, wherein the source points of different lines having same source positions, and wherein receiver positions in different lines have different crossline offsets.

10. The method according to claim 8, further comprising: obtaining the data set by interpolating data in the crossline direction to obtain data at interpolated receiver positions having crossline offsets between the crossline offsets of the lines of receivers in the seismic data.

11. The method according to claim 7 wherein, for each source position, receiver positions have both negative and positive offsets in the inline direction.

12. The method of claim 1, wherein the properties of direct arrivals and the ghosts of the direct arrivals are determined from an estimate of the source signature.

13. The method of claim 1, wherein the properties of direct arrivals and the ghosts of the direct arrivals are determined from near-field hydrophone data.

14. A method of processing seismic data comprising:
receiving seismic data obtained from a marine seismic survey in which a plurality of source positions are located on a single source line and a plurality of receiver positions are located along parallel lines having offsets in a crossline direction from the source line, wherein the lines of receivers comprise towed streamers and wherein the seismic data have at least five dimensions, four of which are source crossline, source inline, receiver crossline, and receiver inline, and the fifth of which is time or frequency;
using a computer to read a computer readable non-transitory medium having a computer program stored thereon, wherein the computer program comprises computer readable instructions for:
determining properties of direct arrivals and ghosts of the direct arrivals, wherein the direct arrivals comprise signals traveling directly from a seismic source array through the body of water to seismic receivers disposed at the plurality of receiver positions;
correcting the seismic data by removing the direct arrivals and the ghosts of the direct arrivals;
generating a data set from the corrected seismic data eliminating crossline source coordinate to derive four-dimensional seismic data, three dimensions of which are source inline, receiver crossline offset, receiver inline and the fourth of which is time or frequency;
applying to the data set a non iterative surface related multiple attenuation algorithm to predict multiples; and
eliminating multiples to derive multiple-free seismic data.

15. The method according to claim 14, wherein crossline spacing of the receiver positions in the data set is smaller than crossline spacing of lines of receivers in the received seismic data.

16. The method according to claim 15, further comprising obtaining the data set by combining more than one data set from more than one sail line having the same source positions, wherein the streamer positions in each sail line have different crossline offsets.

17. The method according to claim 15, further comprising obtaining the data set by interpolating data in the crossline direction to obtain data at interpolated receiver positions having crossline offsets between the crossline offsets of the line of receivers.

18. The method according to claim 14, wherein, for each source position, receiver positions have both negative and positive offsets in the inline direction.

19. The method according to claim 14, wherein the surface related multiple attenuation algorithm comprises separating the data into an upgoing and a downgoing wavefield and deriving a multi-dimensional deconvolution operator from the downgoing wavefield.

20. The method according to claim 19, wherein the data includes depth data relating to the depth of the receivers below the water surface, and said depth data is used to derive the upgoing and downgoing wavefields.

21. The method according to claim 19, wherein the data includes pressure data and particle velocity or acceleration data.

22. The method according claim 14, wherein the surface related multiple attenuation algorithm comprises separating the data into an upgoing and a downgoing wavefield and deriving a multi-dimensional deconvolution operator from the upgoing wavefield and from an estimate of a source signature.

23. The method according to claim 14, wherein the data includes data from a plurality of pairs of streamers spaced apart in the crossline direction, wherein each pair consists of a first streamer located at a first depth and a second streamer located at a second depth below the first depth.

24. A method for processing seismic data assuming a 2.5-dimension medium comprising:
receiving seismic data from towed streamer surveys having separate upgoing and downgoing fields, wherein the seismic data have at least five dimensions, four of which are source crossline, source inline, receiver crossline, and receiver inline, and the fifth of which is time or frequency;
from the received seismic data, eliminating crossline source coordinate to derive reduced seismic data, wherein the reduced seismic data have at least four dimensions, three dimensions of which are source inline, receiver crossline, and receiver inline, and the fourth of which is time or frequency;
applying a non-iterative multiple attenuation method to the reduced seismic data to predict multiples; and
eliminating multiples to derive multiple-free seismic data.

25. The method of claim 24, wherein the seismic data having separate upgoing and downgoing fields are acquired by one or more of these surveys:
a survey with over and under streamers;
a survey with repeated passes having different source or streamer depth among passes;
a survey including pressure, and either particle velocity or acceleration; and
a survey with near zero receiver offsets or negative receiver offsets.

26. The method of claim 24, wherein the non-iterative multiple attenuation method is a 2D MAUDD method.

27. The method of claim 24, wherein the non-iterative multiple attenuation method comprises a non-iterative 2D SRME method.

28. The method of claim 24, wherein the seismic data having separate upgoing and downgoing fields are derived using direct arrivals and their ghosts at all incident angles of received seismic reflections.

29. The method of claim 28,
wherein the direct arrivals at certain incident angles are acquired by receivers; and
wherein other direct arrivals at certain incident angles are not acquired by receivers; and
wherein the direct arrivals at certain incident angles that are not acquired by receivers are estimated.

30. The method of claim 24, further comprising:
further reducing the number of dimensions of the reduced seismic data by Fourier transforms into frequency (f) domain and wavenumber domain with respect to receiver crossline ($k_{h_y}$), wherein frequency (f) and wavenumber ($k_{h_y}$) are kept constant and the further reduced seismic data have two-dimensions—source inline and receiver inline;
wherein applying a non-iterative multiple attenuation method to the reduced seismic data to predict multiples comprises:
  for each frequency and each wavenumber, applying a non-iterative 2D multiple attenuation method to the 2D seismic data to predict multiples; and
  repeating last step for all interested frequencies and wavenumbers;
applying reverse Fourier transforms to return the seismic data back to time domain and receiver crossline (yr) domain.

\* \* \* \* \*